July 8, 1952  M. A. MILLER  2,602,413
ALUMINOUS BRAZING PRODUCT AND METHOD OF BRAZING
Filed Aug. 13, 1948
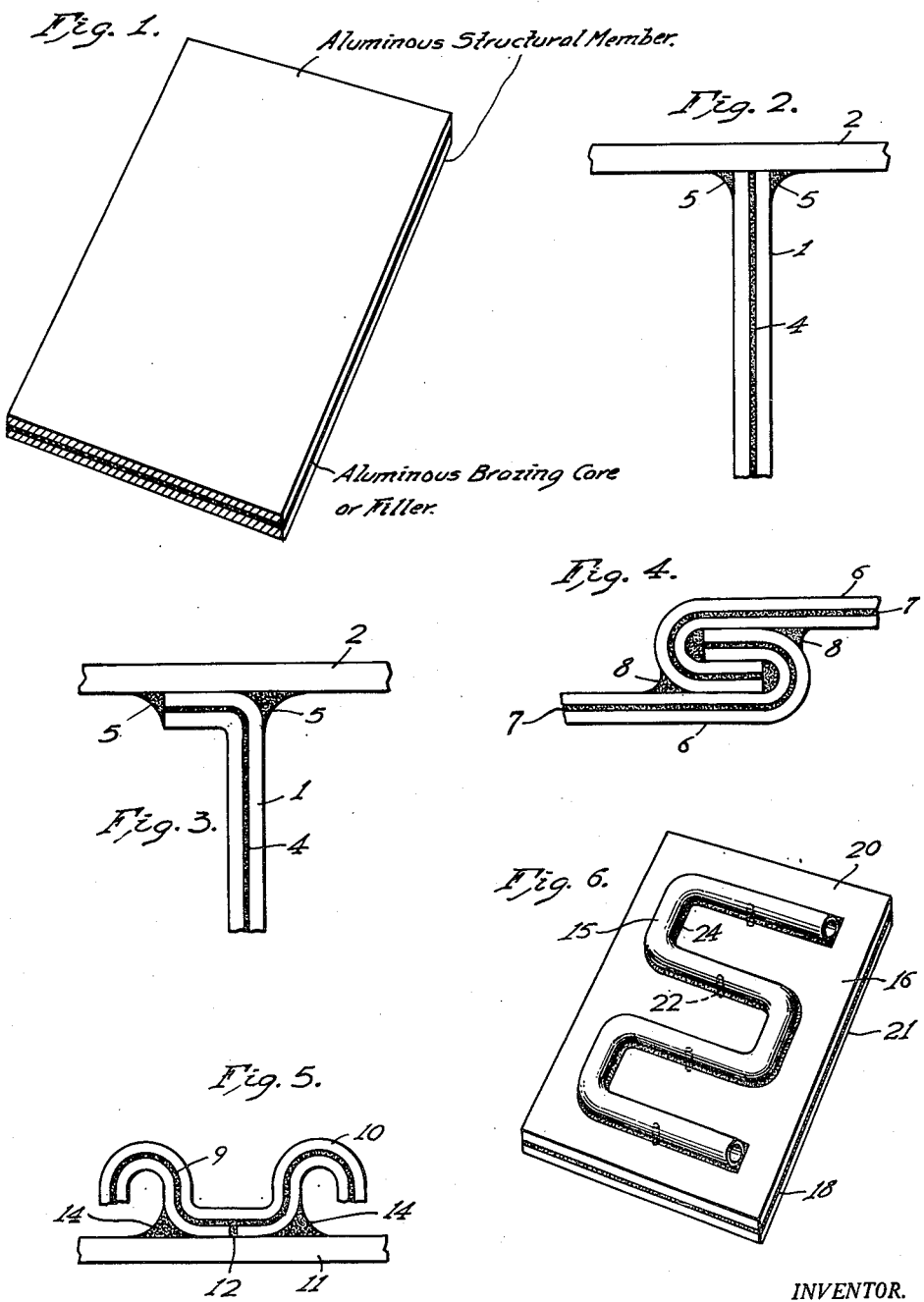
INVENTOR.
Mike A. Miller.
BY
S. Ernest Low.

Patented July 8, 1952

2,602,413

UNITED STATES PATENT OFFICE 2,602,413

ALUMINOUS BRAZING PRODUCT AND METHOD OF BRAZING

Mike A. Miller, New Kensington, Pa., assignor to Aluminum Company of America, Pittsburgh, Pa., a corporation of Pennsylvania Application August 13, 1948, Serial No. 44,148

7 Claims. (Cl. 113—110)

This invention relates in general to aluminous brazing products and methods of producing all-aluminous brazed structures. More specifically, the invention relates to the provision of, and methods of employing, an aluminous brazing product in which an aluminous brazing alloy core or filler is integrally bonded to oppositely disposed faces or surfaces of an aluminous structural member or members, such as is specifically represented by a laminated product comprising two or more aluminous structural alloy sheets or plates integrally bonded to an intermediate layer of aluminous brazing alloy. By "aluminous" is meant aluminum and/or aluminum base alloys in which the element aluminum is present in amounts of more than 50% by weight.

Brazing of aluminous materials has been formerly established as a commercial art. The requisite fusion of the aluminous brazing alloy is obtained in three ways, now, by application of an open torch flame (torch brazing), by immersion in a molten flux bath (flux brazing), and by subjection to a suitable air furnace atmosphere (furnace brazing). Regardless of the manner of fusing the alloy, a flux, capable of removing the tenacious natural oxide and other adhering films from the aluminous surfaces involved in the filleted jointure, is essential so that the molten brazing alloy will wet such surfaces. The further requisites of suitable fluxes for aluminous brazing in the way of proper melting point, fluidity, density and stability are well known, and fluxes of such nature are commercially available. Examples are provided by the specifications of my United States Patents 2,299,164 and 2,299,166, issued October 20, 1942, and 2,357,125 issued August 29, 1944. Accordingly, suitable fluxes for brazing of all-aluminous structures are referred to hereinafter merely as "brazing fluxes."

Aluminous brazing is a relatively high temperature joining practice that permits the fabrication of all-aluminous structures with joints exhibiting the strength of welded or mechanical joints. However, in order to develop maximum strength, the production of a true fillet at each joint is a recognized structural requisite of brazed joints between aluminous structural elements.

Preplacement of the brazing alloy is a necessity in both flux brazing and furnace brazing. The aluminous brazing product disclosed in United States Patent 2,312,039, issued February 23, 1943 to Gustav O. Hoglund, comprises a structural layer of aluminum alloy provided with an integral coating of aluminous brazing alloy on one or both sides thereof. The Hoglund product represents the highest stage of development of the preplacement of the brazing alloy prior to this invention.

Since the coating of the Hoglund product is the aluminous brazing alloy, that material must be heated to at least its melting point to produce a brazed fillet joint. As a consequence the residual coating following brazing has a cast structure and the undesirable surface characteristics associated therewith. The resulting cast structure creates a further disadvantage if the brazed structure is to be provided with an artificial oxide coating. The aluminous brazing alloys that have been found to be most useful commercially are aluminum base alloys containing appreciable amounts of silicon. The aluminum-silicon alloys having a cast structure turn relatively dark in appearance upon being artificially oxide coated, and, if the coating is dyed, exhibit non-uniform color absorption. These disadvantages are entirely overcome by this invention wherein the higher melting point wrought aluminous members of the product constitute the exposed surfaces and the aluminous brazing alloy is incorporated as a filler core that is unexposed except, as a fillet, immediately adjacent a brazed joint, as will be more fully described hereinafter.

It is a primary object of the invention to provide an aluminous brazing product, incorporating an integrally and coextensively adhered filler or core of aluminous brazing metal and a method of employing such a product.

It is another object to provide an aluminous structural member incorporating an integrally joined and bonded filler or core of aluminous brazing metal exhibiting characteristics of composition and flow under heat and flux, and in the presence of a capillary environment, that will insure formation of an externally filleted joint.

A further object of the invention is to provide an aluminous structural member capable of fillet jointure with another aluminous member by brazing, in which the first mentioned member is composed of multi-layers of structural aluminous alloy separated by integrally bonded and adhered aluminous brazing alloy.

Other objects, such as aluminous brazed structures and methods of producing the same, will become apparent to those skilled in the art upon consideration of the following description.

My invention, both as to product and method, is primarily predicated upon my discovery that it is possible to obtain at brazing temperature from an aluminous brazing alloy serving as a coextensive bonding layer for adjoining aluminous members having a melting point higher than the brazing temperature, a flow sufficient to provide metal for a fillet joint, but without impairment of the laminate bonding effectiveness of the brazing alloy. No flow or fillet formation of the brazing alloy can be induced merely by heat and the presence of a brazing flux. The touchstone of success is the further provision of a suitable capillary environment in the vicinity of an exposed portion of the filler or core of brazing alloy. The normal bearing of an edge of the laminate exposing the filler or core of brazing alloy upon the aluminous element with which the brazed fillet joint is to be made will create the necessary capillary environment in the event the correct relationship exists between the total thickness of a particular laminate and the thickness of its filler or core.

For example, I have discovered that, within the laminate thickness range of 0.010 to 0.500 inch, the thickness of the filler or core of brazing alloy should be in the approximate range of 20.0 to 2.0% of the total laminate thickness, the percentage thickness of the filler decreasing with increasing thickness of the laminate, and provided the filler or core thickness is never less than 0.002 inch. It is not essential, however, that the stated percentage relationship of filler to laminate thickness follow a lineal proportionality, a fixed thickness of the filler or core being satisfactory, in many cases, for several gauges of laminate within the laminate thickness range stated above. Within the laminate thickness range of 0.010 to 0.10 inch, the core or brazing alloy can be within the thickness range of 0.002 to 0.004 inch in a practical application of the invention.

Thus, in the broadest aspect of my invention, I have found that an all-aluminous brazing product and practice can be provided in which the aluminous brazing alloy retains its identity as a bonding core between coextensive adjoining members without detriment to its brazing qualifications and characteristics. Consequently, the aluminous composition of the structural members may be chosen to satisfy the prospective service conditions of the brazed product and the desired wrought condition of the exposed laminate members is obtained.

For the purposes of my invention, the solidus temperature of the aluminous body portions of the laminate should be higher than the brazing temperature. Accordingly, there must be a differential between the liquidus temperature of the aluminous filler metal or brazing alloy and the solidus of the aluminous body portions, and that differential preferably should be about at least 5° C. Such a differential can be most conveniently obtained by employing as filler metal or brazing alloy aluminum base alloys containing from about 2 to 15% of silicon. To such alloys may be added, singly or in combination, zinc, copper and beryllium in amounts from about 0.5 to about 12% for zinc, from about 2.0 to 6.0% for copper and from about 0.05 to 1.0% for beryllium. Brazing temperatures in the range between about 560 to about 650° C., depending upon the liquidus and solidus temperatures respectively of the filler core and body members, may be employed with the time of brazing adjusted to insure both retention of the integral relationship between body members and filler core and sufficient melting of the filler core to obtain a sound fillet and joint.

With reference now to the attached drawing, it is to be noted that:

Fig. 1 illustrates one form of aluminous brazing product of the invention, wherein flat plates are integrally joined in cohesive relationship by a layer or core of aluminous brazing alloy;

Fig. 2 illustrates a T-joint incorporating the product of the invention;

Fig. 3 illustrates a modified form of T-joint in which the product of the invention has been flange-joined;

Fig. 4 illustrates the product of the invention incorporated in a brazed lock-seam joint;

Fig. 5 illustrates a lapped joint comprising a shaped plate formed from the product of the invention in its attachment by brazing to a second member; and Fig. 6 is illustrative of one of the many possibilities in the construction of a cooler or evaporator unit employing the product of the invention.

Fig. 1 illustrates a sheet or plate of my aluminous brazing product in which two wrought structural aluminous alloy members are integrally bonded together through the medium of a coextensive aluminous brazing alloy layer likewise of wrought nature. The product of Fig. 1, I have found, can be produced by reducing simultaneously, as by rolling the superimposed layers of the several alloys employed until the desired gauge or cross sectional thickness is obtained. Throughout such reduction the initial ratio of brazing alloy sectional thickness to the sectional thickness of the adjoining structural alloys will remain substantially unchanged. The rolling operation may be started with hot rolling of a compound ingot in which an initial bond has been obtained by casting, such as by casting the brazing alloy core against separated plates of the structural alloys. The preferred manner of initiating rolling is to begin by hot rolling superimposed slabs of the several alloys forming the final product and in this manner obtain a rolled bond as is conventional in producing multiplex aluminous plate and sheet of conventional structural alloys. It will be understood that multiple laminations of body members, separated or interleaved and integrally bonded by aluminous brazing metal are contemplated and may be similarly produced. In addition, the body members on either side of the core may have different compositions and different thicknesses.

The remaining illustrations, Figs. 2 through 6, represent exemplary aluminous brazed structures or assemblies employing the product and practice of the invention. In Figs. 2 and 3, T-joints are illustrated, the product of the invention 1 serving in both instances as the vertical leg of the T. In both illustrations, a capillary environment for the aluminous brazing alloy filler or core 4 is provided by disposing the product 1 in bearing contact with a second aluminous member 2, as by means of a suitable jig or fixture, not shown. Flux is applied to the jointure surfaces of the members 1 and 2 and the assembly subjected to sufficient heat to produce a liquid phase for the intermediate brazing layer 4. A fillet joint results, as illustrated, the brazing alloy core metal 4 being drawn by capillary attraction to the designated points 5. The exposed surfaces of the structures retain their original surface condition except for the fillet formations and may be treated in any recognized manner permissible to the original material.

Fig. 4 illustrates a brazed lock-seam joint incorporating two composite aluminous structural members 6 curled into lock-seamed arrangement, an application of flux applied to the jointure surfaces and sufficient heat supplied adjacent the joint to fuse the intermediate layers 7 of aluminous brazing metal. The capillary arrangement produced by the assembly, in the presence of the flux and heat, results in the fillet formations 8.

Fig. 5 represents, by way of a further example of the use of the product of the invention, a brazed assembly of individual parts suitable for incorporation in an intercooler or heat exchanger. In this illustration, an aluminous brazing product or sandwich sheet member 10, provided with its integrally bonded aluminous brazing core 9, is first worked and preformed to provide a plurality of curved portions, which, in cooperation with a flat plate 11 of aluminous material, would serve as fluid passages in a completed structure. To accomplish filleted jointure between members 10 and 11, one or more small drilled, punched or otherwise formed holes or apertures 12 are provided in the surface of product 10 in contact with plate 11, the holes extending a sufficient depth to permit the brazing core 9 to flow under the influence of heat, brazing flux and capillary attraction to produce fillets 14.

In Fig. 6, a modified form of intercooler or like apparatus is disclosed in which the product of Fig. 1 may be employed. Using the product of Fig. 1, an aluminous member in the form of a preformed aluminous tube 15 is brazed to a composite plate or aluminous structural member 16 having an intermediate layer or core 18 or aluminous brazing alloy integrally joined to the oppositely disposed faces of members 20 and 21. As in the previous structure (Fig. 5) one or more small apertures 22 are formed in the surface of plate 20 and extend into the filler layer 18. The jointure surfaces of tube 15 and member 16 are flux coated and the assembly subjected to sufficient heat to produce capillary flow of the brazing alloy to complete filleted jointure 24 between the plate and tube.

It will be appreciated from the foregoing specific examples of all-aluminous brazed structures that the aluminous brazing product of this invention is a freely workable member exhibiting all the characteristics of a single sheet of wrought aluminum alloy incorporating an interiorly disposed aluminous brazing alloy integrally bonded therewith.

Aluminous brazing alloys having the following nominal compositions (on a weight basis):

(1) 5.0% silicon.
(2) 7.5% silicon.
(3) 5.0% silicon+1.0% zinc.
(4) 10.0% silicon+4.0% copper.
(5) 12.0% silicon+0.1% beryllium.
(6) 10.0% silicon+10.0% zinc+4.0% copper have been successfully employed in various combinations in coextensive, integral, bonded relationship between oppositely disposed faces of aluminous base structural members in wrought form having the nominal compositions, by weight:

(a) High purity aluminum
(b) 1.25% manganese
(c) 0.95% magnesium + 0.55% silicon + 0.25% copper + 0.25% chromium
(d) 0.60% magnesium + 0.35% silicon + 0.25% copper + 0.50% iron
(e) 4.0% zinc + 1.5% manganese + 1.0% magnesium + 0.05% copper + 0.20% silicon + 0.40% iron
(f) 6.5% zinc + 0.35% magnesium + 0.50% copper + 0.10% iron + 0.15% silicon + 0.10% titanium to produce the aluminous brazing products of the invention.

I claim:

1. A wrought aluminous brazing product comprising a plurality of aluminous structural members separated and coextensively joined by a layer of aluminous brazing alloy containing from about 2 to 15% silicon, said aluminous brazing alloy exhibiting a liquidus temperature at least 5° C. below the solidus temperature of the aluminous structural members, and said aluminous brazing alloy layer being at least 0.002 inch in thickness.

2. In a method of making an all-aluminous unitary brazed structure the steps comprising, assembling in capillary arrangement at the area of desired jointure two aluminous parts at least one of which is a wrought sheet-like aluminous brazing product having laminated structural members interleaved and coextensively bonded together by a filler layer of an aluminous brazing alloy having a minimum thickness of 0.002 inch and containing from about 2 to about 15% of silicon, applying brazing flux to the area of jointure, and heating the assembly to a temperature in the range between about 560 to about 650° C. to render the alloy brazing filler layer sufficiently molten to effect joining and the production of an external fillet.

3. A wrought aluminous brazing product comprising an aluminous laminate having at least two aluminous structural members the oppositely disposed surfaces of which are integrally bonded and joined with an aluminous brazing alloy containing from about 2 to 15% silicon, said laminate, in terms of any two oppositely disposed and integrally bonded aluminous structural members within the laminate thickness range of 0.010 to 0.500 inch, having the brazing alloy present within the range 20.0 to 2.0% of the laminate thickness, said brazing alloy percentage thickness decreasing with increasing thickness of the laminate, and said brazing alloy thickness being at least 0.002 inch.

4. A wrought aluminous brazing product comprising an aluminous laminate having at least two aluminous structural members with oppositely disposed surfaces bonded and joined with an aluminum-silicon brazing alloy containing from about 2 to 15% silicon and exhibiting a liquidus temperature at least 5° C. lower than the solidus temperature of the aluminous structural members, said laminate, in terms of any two oppositely disposed and integrally bonded aluminous structural members within the laminate thickness of 0.010 to 0.500 inch, having the aluminum-silicon brazing alloy present within the range 20.0 to 2.0% of the laminate thickness, said aluminum-silicon brazing alloy thickness decreasing with increasing thickness of the laminate, and said aluminum-silicon brazing alloy thickness being at least 0.002 inch.

5. An aluminous brazing product comprising a plurality of aluminous structural members separated and coextensively joined by an aluminous brazing alloy containing between about 2 to about 15% silicon and exhibiting a liquidus temperature at least about 5° C. below the solidus temperature of the aluminous structural members, said aluminous brazing alloy having a minimum thickness of at least 0.002 inch and being approximately 2 to 20% of the brazing product thickness measured through any two integrally joined aluminous structural members and coextensive intermediate brazing alloy layer.

6. A wrought aluminous brazing product comprising a plurality of aluminous structural members separated and integrally joined with a filler layer of aluminous brazing alloy, said aluminous brazing alloy containing from about 2 to 15% silicon, with or without one or more of the elements zinc, copper and beryllium, and exhibiting a liquidus temperature at least 5° C. lower than the solidus temperature of its integrally joined aluminous structural members, and said aluminous brazing alloy layer having a minimum thickness of at least 0.002 inch and being approximately 2 to 20% in thickness of the wrought aluminous brazing product measured normally through any two integrally joined structural members and integrally joined intermediate filler layer of aluminous brazing alloy, said wrought aluminous brazing product being capable of filleted jointure with another aluminous member in capillary environment with said filler layer and in the presence of brazing flux and heat.

7. A wrought aluminous brazing product comprising a plurality of separated aluminous structural members in sheet form having their flat faces disposed towards each other, a filler layer of aluminous brazing alloy between adjacent pairs of sheets and coextensively joining the aluminous brazing product in laminate form, said aluminous brazing alloy filler layer containing from about 2 to 15% silicon, with or without one or more of the elements zinc between about 0.5 to 12%, copper between about 2 to 6%, and beryllium between about 0.05 to 1%, and exhibiting a liquidus temperature of at least 5° C. lower than the solidus temperature of the integrally joined structural members, said aluminous brazing alloy filler layer having a minimum thickness of at least 0.002 inch and being approximately 2 to 20% in thickness of the wrought aluminous brazing product measured normally through any two coextensively joined aluminous structural members and intermediate filler layer, said wrought aluminous brazing product being capable of filleted jointure with another aluminous member in capillary environment with said filler layer and in the presence of heat and brazing flux.

MIKE A. MILLER.

REFERENCES CITED

The following references are of record in the file of this patent:

UNITED STATES PATENTS

| Number | Name | Date |
| --- | --- | --- |
| 699,592 | Thompson | May 6, 1902 |
| 1,865,089 | Dix | June 28, 1932 |
| 1,997,166 | Brown | Apr. 9, 1935 |
| 2,258,681 | Hoglund | Oct. 14, 1941 |
| 2,354,409 | Strasser | July 25, 1944 |
| 2,383,511 | Reynolds | Aug. 25, 1945 |
| 2,386,889 | Furry | Oct. 16, 1945 |
| 2,443,577 | Finlay | June 16, 1948 |